Figure 1:
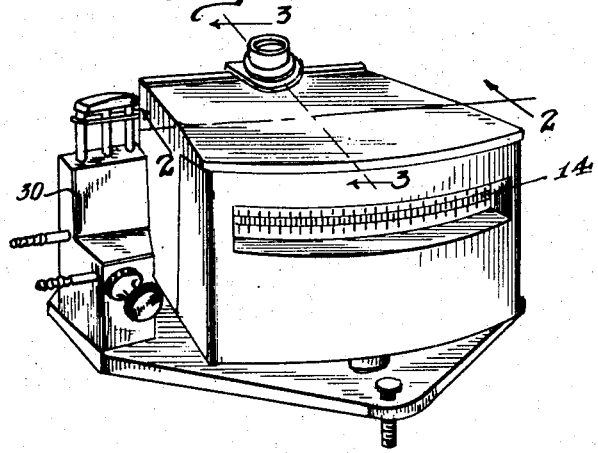

Feb. 25, 1947.  L. PAULING  2,416,344
APPARATUS FOR DETERMINING THE PARTIAL PRESSURE
OF OXYGEN IN A MIXTURE OF GASES
Filed Aug. 23, 1941

Inventor
Linus Pauling
By Lyon & Lyon
Attorneys

Patented Feb. 25, 1947

2,416,344

UNITED STATES PATENT OFFICE 2,416,344

APPARATUS FOR DETERMINING THE PARTIAL PRESSURE OF OXYGEN IN A MIXTURE OF GASES

Linus Pauling, Pasadena, Calif., assignor to California Institute Research Foundation, Pasadena, Calif., a corporation of California Application August 23, 1941, Serial No. 408,116

14 Claims. (Cl. 175—183)

It is the general object of the present invention to provide an apparatus for indicating a partial pressure of oxygen in a mixture of gases, which apparatus employs a simple, rugged, light-weight apparatus.

Another object of the present invention is to provide an apparatus capable of affording continuous indication of the partial pressure of oxygen in a mixture of gases.

The apparatus of the present invention is based on the principle that the force acting on a test body in an inhomogeneous magnetic field is dependent on the magnetic susceptibility of the medium surrounding the test body. Oxygen is a strongly paramagnetic gas, its volume susceptibility at 20° C. and 1 atmosphere pressure being $+142 \times 10^{-9}$ c. g. s. u. Nitrogen is diamagnetic, with volume susceptibility $-0.40 \times 10^{-9}$, which is only $1/355$ as large in magnitude. All other common gases are diamagnetic, with susceptibility values not far from that of nitrogen. Accordingly, it is found that a measurement of the magnetic susceptibility of a mixture of gases provides a measurement of the partial pressure of oxygen in the gas mixture with very little error or need for correction because of the presence of the other gases. The only gases other than oxygen which are paramagnetic are nitric oxide, nitrogen dioxide, and chlorine dioxide, which have volume magnetic susceptibilities about one-half that of oxygen. The apparatus of the present invention is, therefore, of value in determining the oxygen content of the mixture of gases, except where such other paramagnetic gases as nitric oxide, nitrogen dioxide, and chlorine dioxide are present.

Heretofore, as far as I know, there has been no light-weight, rugged apparatus effective for measuring the magnetic susceptibilities of gases, nor has a measurement of the magnetic susceptibility of gases been employed as a means for affording the visual indication of the partial pressure of oxygen in a mixture of gases.

Accordingly, one of the objects of the present invention is to provide a method utilizing an apparatus light in weight and rugged. Such an apparatus has been found to be provided by the use of a small permanent magnet designed to provide an inhomogeneous magnetic field associated with a rotating test bar mounted on a quartz fiber stretched across a yoke.

The principles on which the instrument is based are as follows: A test body, such as a small glass sphere, placed in a homogeneous magnetic field, such as that between flat, large pole pieces of a magnet, does not experience any force. A test body placed in an inhomogeneous field of force, such as that at positions to one side of the center line between wedge-shaped pole pieces, is, however, acted upon by a force acting in the direction of the greatest inhomogeneity of the field. The force is proportional in magnitude to the volume of the test body, $v$, to its volume magnetic susceptibility, $X_v$, to the magnetic field strength, $H$, and to the inhomogeneity of the field $$\frac{\partial H}{\partial x}$$

that is, $$F = vX_v H \frac{\partial H}{\partial x}$$

The foregoing equation is for the case of the test body in a vacuum. If the test body is in a medium, such as a gas, with magnetic susceptibility differing from zero, the following equation must be used, in which $X_v'$ is the volume susceptibility of the medium:

$$F = v(X_v - X_v')H\frac{\partial H}{\partial x}$$

It is thus seen that the force acting on the test body is the difference between the force due to the interaction of the body with the magnetic field and the force with which the magnetic field would act on the part of the medium which would occupy the volume displaced by the test body. This latter force actually results from the pressure exerted on the test body by the medium. Accordingly, as shown by the second equation, the force acting on the test body varies linearly with the magnetic susceptibility of the surrounding medium and the measurement of the force can be employed to measure the susceptibility of the medium.

Utilizing the foregoing principles, I have devised an apparatus for measuring the partial pressure of oxygen in a mixture of gases in which a light-weight rugged apparatus is employed and in which only a few cubic centimeters of gas is required for measurement. Moreover, the apparatus of the present invention does not change the composition of the gas by the measuring operation. The apparatus of the present invention furthermore can be used to indicate continually, with a lag of only a second or two, the partial pressure of oxygen in a stream of gas.

Figure 2:
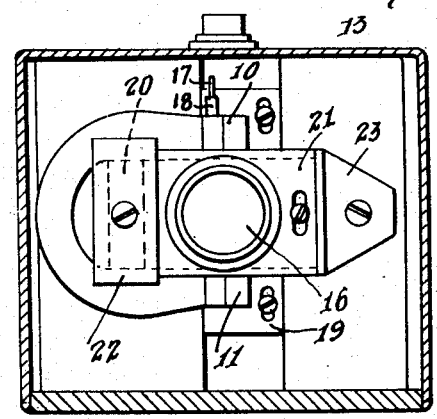
Figure 4:
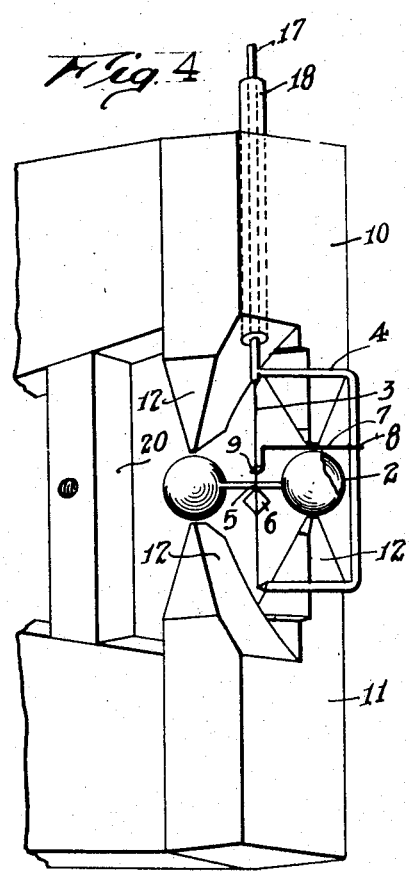
Figure 3:
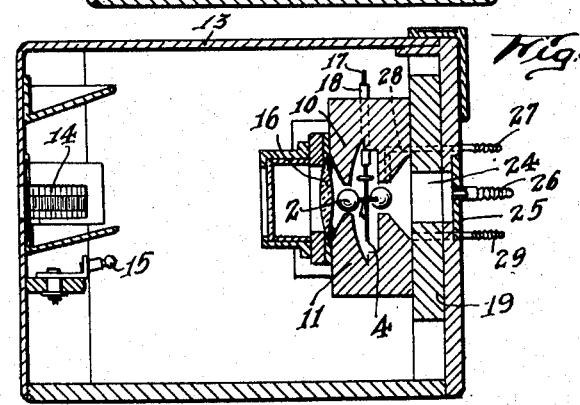

The apparatus of the present invention, together with various additional objects and advantages thereof, will best be understood from the following description of a preferred form or example of an apparatus embodying the invention. For that purpose, I have hereinafter described such a preferred form or example of the invention in connection with the accompanying drawing, in which Figure 1 is a perspective view.
Figure 2 is a section on the line 2—2 of Figure 1.
Figure 3 is a section on the line 3—3 of Figure 1.
Figure 4 is an enlarged fragmentary perspective view of the test body and magnet assembly.

Referring to the drawing, the test body 2 is in the form of a dumb bell formed, for example, by two hollow glass spheres, about 3 mm. in diameter, filled with air or nitrogen at 1 atmosphere pressure, two of such glass spheres being sealed to the ends of a small glass tube to form the dumb bell.

A fine quartz fiber, about 0.005 mm. in diameter, is stretched across a small quartz yoke 4 and fused to the end of said yoke. The test body 2 is then cemented to the fiber 3 at its center, as indicated at 5, by a suitable cementing medium, for example glyptal. Care should be exercised in making the two spheres of the dumb bell nearly equal in both volume and mass and in mounting it, so that its center of volume and center of mass both coincide with the point 5, where it is attached to the fiber 3. The position of the center of mass can be adjusted by attaching small amounts of shellac to the spheres after the dumb bell is mounted.

There is attached to the test body dumb bell 2 a small mirror 6, preferably made of a sheet of mica coated with aluminum. Means are also provided for damping the rotational movement of the dumb bell or test body 2. For this purpose, a fine wire 7 is mounted, as indicated at 8, on the yoke 4, and provided with a small loop 9 through which the fiber 3 extends. This loop is made to hold a suitable material to apply a viscous friction to the rotation of the fiber 3. For example, a small sphere of glyptal, about 0.4 mm. in diameter, may be melted about the quartz fiber 3 where the fiber passes through the loop 9 and a small drop of non-volatile oil placed in the loop 9. The viscous friction in the oil of the small sphere of glyptal provides the essential critical damping of the assembly. A particular advantage of the apparatus of the present invention is that the moving part of the assembly may be readily produced with a mass as low as 2 mg.

The apparatus includes a permanent magnet provided with two substantially complementary pole pieces 10 and 11 of soft iron, each having two wedge shaped faces 12 spaced apart approximately equally to the spacing between the test bodies of the dumb bell 2. These pole pieces provide the inhomogeneous magnetic field for each of the two test bodies or spheres of the dumb bell 2. The arrangement of the pole pieces is such that the resultant force is a torque, which tends to cause rotation of the dumb bell 2 about the fiber axis 3, which is resisted by the torsional elasticity of the fiber. The resultant equilibrium orientation, which depends on the magnetic susceptibility of the gas surrounding the dumb bell, and hence essentially on the partial pressure of the oxygen in the gas, is indicated by reflecting a beam of light from the small mirror to a scale. For this purpose, the apparatus is indicated as including a housing 13 having a scale 14 in position to receive light from the mirror 6 and a source of light 15 in position to illuminate the mirror 6. A lens 16 is interposed between the mirror 6 and the scale 14 for the purpose of focusing the beam of light to a narrow line of light on the scale 14.

The quartz yoke 4 is held in proper relationship to the pole pieces 10 and 11 of the magnet, for which purpose the yoke 4 is attached to or integral with a rod 17 passing through a soft iron bushing 18 extending through the pole piece 10. To limit the amount of gas acted upon by the instrument means are provided to form a small enclosure around the dumb bell 2, which small enclosure preferably holds a few cc. of gas. Such an enclosure is provided in part by the rear wall 19 of the casing against which the magnet is mounted. A partition 20 is provided between the legs of the magnet and a front member 21 which holds the lens 16 is bolted to the partition 20 by a plate 22 and forms the front wall of the enclosure of the gas under test. An end piece 23 is provided suitably shaped to closely enclose the yoke 4 and the dumb bell.

In the preferred form of the apparatus, three inlets are provided to the test space and for this purpose the plate 19 is indicated as having a relatively large aperture 24, which may be left open when the instrument is intended for measuring the oxygen content of the atmosphere surrounding the instrument but which is indicated as closed by a plate 25 through which extends a small tube 26 for the introduction of gas. A second tube 27 is indicated as passing through the plate 19 and connecting with bores 28 in the pole piece 10 leading to the space around the dumb bell 2. A third inlet is provided by a tube 29 connecting through the plate 19 with the space around the dumb bell 2. The inlets described provide means by which a limited amount of gas under any desired pressure may be introduced into the instrument for test. The instrument may also include any valve arrangement, such as indicated at 30, for controlling the admission of gas to be tested.

The complete instrument has been built to cover the following ranges of partial pressure of oxygen:

|   | Millimeters |
|---|---|
| O | 80 |
| O | 120 |
| O | 160 |

The accuracy of the instrument, as far as known, is about ±1 mm. to ±2 mm.

While the particular form of the apparatus herein described is well adapted to carry out the objects of the present invention, various modifications and changes may be made, and the invention is of the scope of the appended claims.

I claim:

1. An apparatus for determining the partial pressure of oxygen in a mixture of gases, which comprises a permanent magnet having wedge-shaped pole pieces to provide inhomogeneous magnetic fields associated with two test bodies, said test bodies being connected in the form of a dumb bell, said dumb bell being mounted for rotation against the torsional resistance of a fiber, and means for confining the gases to be tested around said test bodies.

2. An apparatus for determining the partial pressure of oxygen in a mixture of gases, which comprises a permanent magnet having wedge-shaped pole pieces to provide inhomogeneous magnetic fields associated with two test bodies, said test bodies being connected in the form of a dumb bell, said dumb bell being mounted for rotation against the torsional resistance of a fiber, means for confining the gases to be tested around said test bodies, and damping means for said dumb bell.

3. An apparatus for determining the partial pressure of oxygen in a mixture of gases, which comprises a permanent magnet having wedge-shaped pole pieces to provide inhomogeneous magnetic fields associated with two test bodies, said test bodies being connected in the form of a dumb bell, said dumb bell being mounted for rotation against the torsional resistance of a fiber, means for confining the gases to be tested around said test bodies, and damping means for said dumb bell, said damping means including an enlargement formed on said fiber, and means for holding a viscous fluid around said enlargement.

4. An apparatus for testing the partial pressure of oxygen in a mixture of gases, which comprises a permanent magnet having pole pieces, each pole piece being provided with two wedge-shaped projections for forming inhomogeneous fields of force for two test bodies, the two test bodies associated with said pole pieces and connected to form a dumb bell, a fiber mounting said dumb bell for rotary movement restrained by the torsional resistance of said fiber, means for damping the movement of said dumb bell, and a mirror carried by said dumb bell.

5. An apparatus for determining the partial pressure of oxygen in a mixture of gases, which apparatus includes dual sets of permanent magnets, each set having pole pieces shaped to provide an inhomogeneous magnetic field; rotatable test bodies mounted on a common fiber for torsional movement about the axis thereof within said magnetic fields, said fiber being disposed between said sets of pole pieces; and means for confining a limited amount of gas to be tested around said test bodies.

6. An apparatus for determining the partial pressure of oxygen in a mixture of gases which comprise: a permanent magnet having dual pole pieces shaped to produce similar dual inhomogeneous magnetic fields; a rotatable test body disposed in each magnetic field; a mounting yoke; a quartz fiber stretched between and secured by its extremities to said yoke, said test bodies being supported from said quartz fiber for torsional movement about the axis thereof; and means for confining around said test bodies the gases to be tested.

7. An apparatus for determining the partial pressure of oxygen in a mixture of gases, which apparatus includes: a permanent magnet having dual pole pieces shaped to provide dual inhomogeneous magnetic fields; a mounting yoke between said magnetic fields; a fiber stretched between and secured by its extremities to said yoke; a rotatable test body for each magnetic field mounted on said test fiber; means for confining around said test bodies a limited amount of gas to be tested; and a mirror mounted on said fiber for movement in response to movement of said test bodies; and a scale positioned to receive a beam of light reflected from said mirror.

8. An apparatus for determining the partial pressure of oxygen in a mixture of gases, which comprises: a permanent magnet having dual pole pieces shaped to form dual inhomogeneous magnetic fields; a mounting yoke; a quartz fiber stretched between and secured by its extremities to said yoke, said fiber being disposed between said magnetic fields; a test body for each of said magnetic fields supported from said quartz fiber for torsional movement about a common axis; means for confining around said test bodies the gases to be tested; a mirror positioned to respond to movement of said test bodies; and a scale mounted to receive a beam of light reflected from said mirror.

9. An apparatus for determining the partial pressure of a magnetically susceptible gas in a mixture of gases, comprising: a magnetic means including two sets of opposed pole pieces shaped to produce substantially parallel but inhomogeneous magnetic fields; a suspension element passing between the sets of pole pieces; and a test body differing in magnetic susceptibility from the gas to be determined and movable between the members of each set of pole pieces, said test bodies being supported by and rotatable about the axis of said suspension element.

10. An apparatus for determining the partial pressure of a magnetically susceptible gas in a mixture of gases, comprising: means defining a chamber adapted to contain the gas mixture to be tested; a magnetic means within said chamber including two sets of opposed pole pieces adapted to produce dual but inhomogeneous magnetic fields in said chamber; a test body movable in each magnetic field and having, by comparison to said gas, diamagnetic properties; and means for supporting said test bodies for rotation simultaneously into and out of said magnetic fields.

11. An apparatus for determining the partial pressure of a magnetically susceptible gas in a mixture of gases, comprising: means defining a chamber adapted to contain the gas mixture to be tested; a torsional suspension element; test bodies supported for torsional movement about said suspension element, said test bodies being diamagnetic in comparison to said gas; magnetic means including pole pieces disposed on opposite sides of each test body and shaped to establish an inhomogeneous magnetic field therearound, and oriented in a direction to cause application of a torsional force on each test body.

12. An apparatus for determining the partial pressure of a magnetically susceptible gas in a mixture of gases, comprising: means defining a chamber adapted to contain the gas mixture to be tested; a torsional suspension element; test bodies supported for torsional movement about said suspension element, said test bodies being diamagnetic in comparison to said gas; magnetic means including pole pieces disposed on opposite sides of each test body and shaped to establish an inhomogeneous magnetic field therearound, and oriented in a direction to cause application of a torsional force on each test body.

13. An instrument for detecting and determining the partial pressure of a selected gas in a mixture of gases by magnetic susceptibility of said selected gas, comprising: a chamber adapted to contain the mixture of gases to be tested; test bodies within said chamber having magnetic susceptibilities differing from the gas to be detected, and mounted symmetrically about a common center; a torsion suspension element common to said test bodies; and magnetic means including pairs of pole pieces for each test body shaped and disposed to cause a torsional force on each of said test bodies in proportion to the partial pressure of said selected gas.

14. An apparatus for determining the partial pressure of a magnetically susceptible gas in a mixture of gases, comprising: a torsion suspension element; means for measuring torsional movement of said element; test bodies symmetrically disposed about said element and supported therefrom to exert upon arcuate movement torsional forces on said element; said test bodies having magnetic susceptibilities differing from that of said gas; and adapted to be immersed in the gas mixture to be tested; and magnetic means including pole pieces for establishing inhomogeneous magnetic fields in the region of each test body shaded to introduce torsional forces on said test bodies.

LINUS PAULING.

REFERENCES CITED

The following references are of record in the file of this patent:

UNITED STATES PATENTS

| Number | Name | Date |
|---|---|---|
| 2,197,079 | Penning | Apr. 16, 1940 |
| 1,587,010 | Coley | June 1, 1926 |
| 1,958,696 | Digby | May 15, 1934 |

FOREIGN PATENTS

| Number | Country | Date |
|---|---|---|
| 181,579 | British | June 22, 1922 |

OTHER REFERENCES

"Magnetic Phenomena," by Williams. Published by McGraw-Hill, 1931, pages 94, 95, 98 and 99.